Oct. 5, 1937.    R. R. SEARLES    2,094,968
BEARING
Filed April 9, 1935    2 Sheets-Sheet 1

INVENTOR
Raymond R. Searles
BY
Mitchell & Bechert
ATTORNEYS.

Oct. 5, 1937. R. R. SEARLES 2,094,968
BEARING
Filed April 9, 1935 2 Sheets-Sheet 2

INVENTOR
Raymond R. Searles
BY
Mitchell & Bechert
ATTORNEYS

Patented Oct. 5, 1937

2,094,968

UNITED STATES PATENT OFFICE 2,094,968

BEARING

Raymond R. Searles, New Britain, Conn., assignor to The Fafnir Bearing Company, New Britain, Conn., a corporation of Connecticut Application April 9, 1935, Serial No. 15,413

4 Claims. (Cl. 308—180)

My invention relates to a bearing and more particularly to a bearing for use on railway cars or in connection with heavy rolls or the like.

In railway cars bearing boxes are provided and the axle is journaled therein. Such axle is, to some extent, axially movable in the box and, in normal running of a railway car, the axle shifts axially back and forth in the box. The same action often occurs in machines of various kinds. The shafts or axles of railway cars and other machinery are often journaled in a roller bearing which makes no provision for taking end thrusts of the axle and such end thrusts are often substantial and are maintained for considerable periods.

It is the principal object of my invention to provide an improved anti-friction thrust bearing for the axles of railway cars and shafts of various types, which are subjected to intermittent end thrusts and which normally shift axially during operation.

It is another object to provide an anti-friction thrust bearing for an axially shiftable rotating shaft so arranged that the thrust bearing is maintained in rotation by the rotating shaft in various positions of axial adjustment or positioning of the shaft.

It is another object to provide improved lubricating means for an anti-friction bearing.

Other objects and various features of invention will be hereinafter set forth or will become apparent to those skilled in the art.

In the drawings which show, for illustrative purposes only, preferred forms of the invention—

Figure 1:
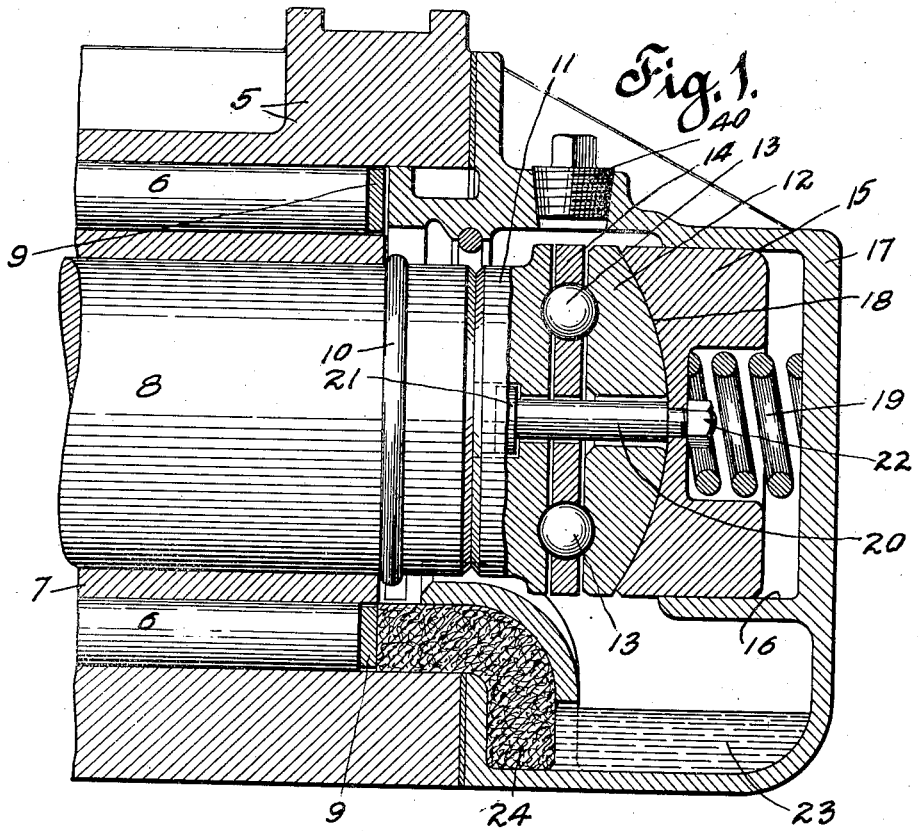
Fig. 1 is a fragmentary central sectional view of an anti-friction bearing box for a railway car axle illustrating features of the invention.

In said drawings 5 indicates a journal box or bearing box which, in the specific form illustrated, is the journal box of a railway car but it is to be understood that such box may be any shaft bearing box and the following description, while specific to a railway journal box, is applicable equally to bearing boxes of various sorts, particularly those for shafts of heavy machinery. The bearing box is provided with an anti-friction bearing, which may comprise rollers 6—6 interposed between a bearing surface in the box 5 and a bearing sleeve 7 mounted on the shaft or car axle 8. The rollers are retained in a suitable retainer, as indicated at 9. The bearing sleeve 7 may be held in place against a shoulder (not shown) on the axle 8 and be positioned by means of a snap ring 10 at the end. During normal operation the shaft or axle 8 shifts axially in the box, and the sleeve 7 simply moves with the shaft and slides longitudinally on the rollers 6 or the rollers themselves may shift.

Various devices for taking end thrusts have been devised but all, so far as I am aware, have been open to some objections, for example, overheating on long sustained end thrusts, as when a car rounds a long curve.

My invention relates particularly to an anti-friction thrust bearing which may be readily lubricated and, in fact, needs but little lubrication and which ordinarily will not overheat and yet will sustain long continued thrusts.

Figure 2:
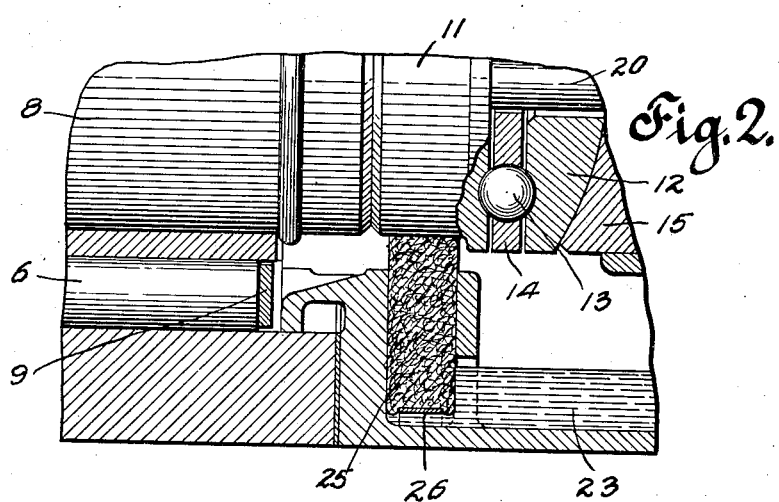
Fig. 2 is a fragmentary view of parts illustrated in Fig. 1 and showing a modification.

In the form shown in Figs. 1 and 2 the thrust bearing comprises a pair of raceway members 11—12 in the form of axially opposed blocks, having raceways for interposed anti-friction bearing members, such as balls 13—13. The balls are preferably retained in a suitable retainer 14, as will be understood. The raceway member 11 is normally constantly maintained in driving relationship with a part of the shaft 8, for example, the end thereof as by direct contact. For the purpose of maintaining the raceway member and shaft 8 in proper driving relationship at all times I provide a reciprocating follower block 15 at the rear thereof, which block is guided by the side walls of a recess 16 in the removable journal box cover cap 17. The adjacent faces of the raceway member 12 and the follower 15 are so shaped that the raceway member 12 will be self-centering with respect to the axis of the shaft 8. This may be accomplished by forming the said surfaces so as to provide a substantially spherical fit as shown in the drawings. A spring 19 is located to the rear of the follower 15 so as to urge the same forwardly and hold the raceway member 11 in contact with the end of the shaft 8 at all times. Under normal conditions the follower block 15 is spaced from the bottom of the cavity in which the block stands. The spring 19 not only performs the aforesaid function but acts as an effective cushioning means to take end thrust of the shaft as it tends to move longitudinally. The major portion of the spring is preferably pocketed in a recess in the back of the block 15 so that in cases of extreme end thrust the follower block 15 may seat against the inner end wall of the cap 17 and check further end thrust. The presence of the spring 19, acting as a checking force, tends to prevent the block 15, in cases of extreme end thrust, from encountering the inner end wall of the cap with such force as to do damage. 20 represents a bolt carried by and secured to the follower block 15 by means of a nut. This bolt passes freely through passages in the members 11, 12 and 14 and is provided with a head 21 located in a counterbore in the member 11 so that the bolt will operate to hold the parts 11, 12, 14 and 15 assembled as a unit. The bores in the parts 11, 12 and 14 and the cavity for the bolt head 21 are of such size as to afford adequate clearance to permit the desired amount of free play relatively to the bolt necessary for self-centering of and the equalizing of the strain on the thrust bearing.

It will be seen that with the parts positioned, for example, as shown in Fig. 1 and with the axle 8 rotating, the raceway member 11 will rotate, as will the balls and retainer. As the shaft shifts toward the left the spring 19 will urge the entire thrust assembly toward the left and maintain the driving relationship between the shaft and the raceway member 11, so that the bearing continues to rotate with the shaft. As the shaft 8 shifts toward the right the driving relationship will be maintained and the spring 19 will be compressed. Of course, if the spring 19 be of sufficient strength it will take the end thrusts of the shaft 8. However, it is often preferable to make the spring 19 of only sufficient strength to assure a proper driving relationship between the shaft 8 and the thrust bearing and permit the rear end of the block 15 to cushion against the end wall of the recess 16 and be stopped thereby in cases of severe end thrust. The thrust bearing is of sufficient sturdiness to sustain the severest end thrust but it is usually quite important to have the thrust bearing rotating at the proper speed at the time of maximum thrust.

The bearing illustrated in Fig. 1 may be lubricated by novel means. In the form shown a lubricant reservoir 23 is provided in a part of the housing, for example, in the cover cap 17, and a wick 24 extends from the reservoir up to and into engagement with the retainer 9 of the radial or roller bearing. As the retainer 9 rotates it will pick up oil from the wick and throw the same off centrifugally, so that the oil will trickle down or be splashed over other rotating parts and be thrown off and lubricate all parts which require lubrication. The oil will also run along the rollers 6 and be carried to all parts of the main or roller bearing and the oil finally returned to the reservoir 23, as will be understood.

In that form of the invention shown in Fig. 2 the parts are or may be substantially the same as heretofore described in connection with Fig. 1, except that the wick 25 extending from the reservoir 23 is spring pressed upwardly by means of a spring 26 into engagement with the rotating peripheral surface of the raceway member 11. The oil will be picked up by the raceway member 11 during its rotation and thrown off centrifugally and be splashed or run onto all parts of the bearing.

Figure 3:
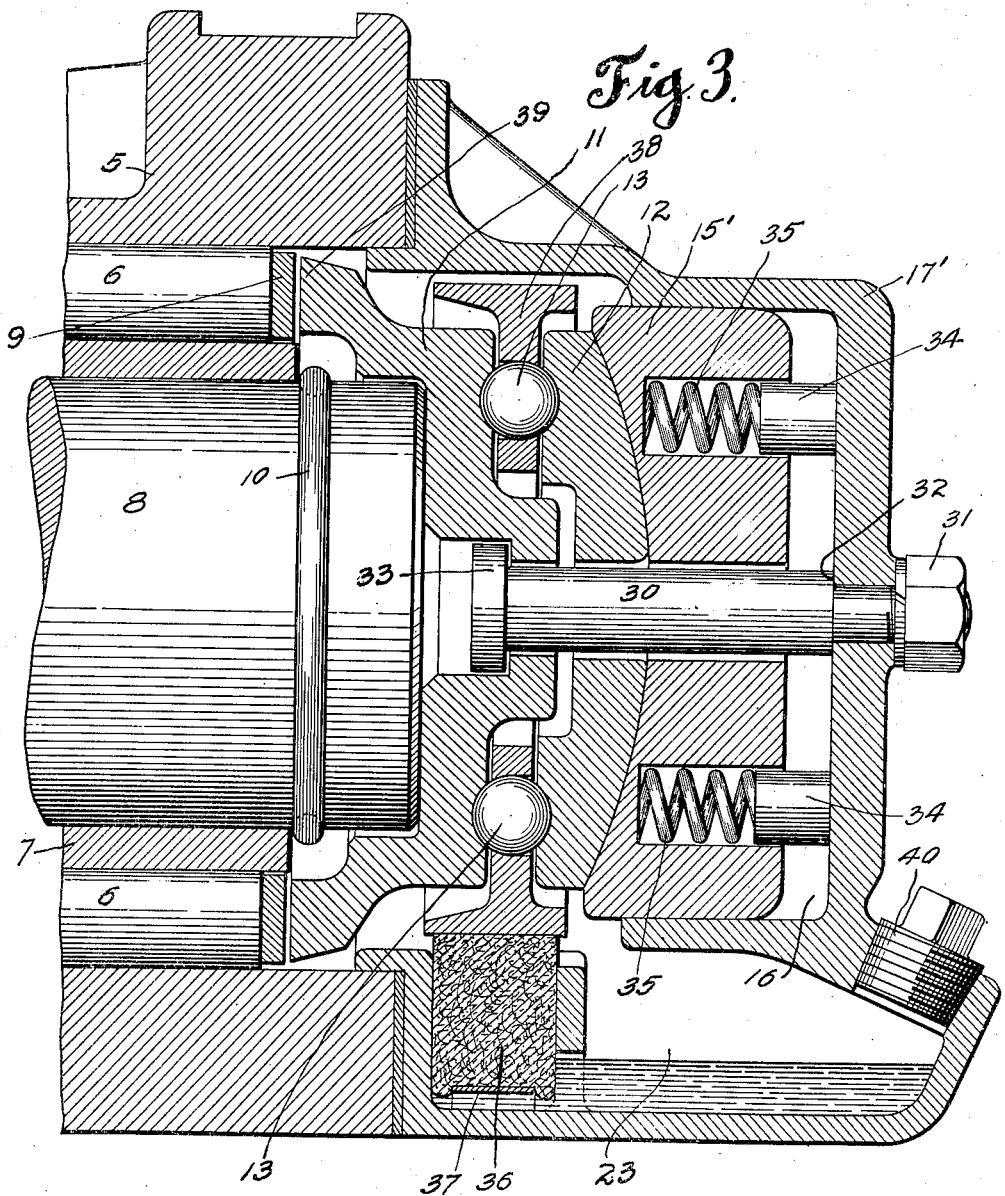
Fig. 3 is a view similar to Fig. 1 but showing a further modification.

In that form of the invention shown in Fig. 3 the various parts of the thrust bearing function substantially as heretofore described. There are, however, some variations in construction. The through-bolt 30 is secured to the cover cap 17' by means of a nut 31 and shoulder 32 on the through-bolt. The head 33 at the opposite end of the through-bolt engages in a recess in the raceway member 11, as heretofore described. The supporting block 15' may be supported as heretofore described in a bore or recess 16 in the cover cap and, in addition, may be guided or supported on studs 34—34, carried by the cover cap and extending into bores or recesses in the block 15'. The studs 34—34 in the alternative may be merely loose plugs to back up the springs. Springs 35—35 are interposed between the block 15' and the cover cap and serve substantially the same purposes as the spring 19 heretofore described. The wick 36, dipping into the oil reservoir 23, is spring pressed upwardly by means of a spring 37 and into engagement with the ball retainer 38, which, as shown, is extended outwardly and provided with a substantially peripheral surface for engagement by the wick. The oil taken up by the retainer and thrown off centrifugally will leak down upon or splash upon the various parts to be lubricated. The raceway member 11 may be extended toward the left, as indicated at 39, and be provided with an inclined or tapering surface so that oil deposited thereon will creep out to the outer circumferential edge and be thrown off and onto the raceway for the rollers 6—6. In other respects the construction and operation may be and preferably are substantially the same as heretofore described. In all forms the reservoir may be filled by removing the filler plugs 40.

My improved thrust bearing will take all end thrusts of the shaft or axle and, regardless of the position of the axle within its normal range, the bearing will always be driven thereby. In cases of extreme thrust, that is, when the shaft is moved toward the right into extreme position, there may be a substantially solid bearing between the shaft and bearing box cover but the thrust of the shaft will always be taken by the thrust balls 13 which are in rotation and which, when properly rotated, will stand the very substantial thrust loads.

While the invention has been described in considerable detail it is to be understood that various changes may be made within the scope of the invention as defined in the appended claims.

I claim:

1. In a device of the character described, a journal box, an anti-friction bearing therein, a shaft radially supported by said bearing, a cover cap detachably carried by said box, a thrust bearing located at the end of said shaft and within said box, a reciprocating follower guided in a recess in said box and freely movable toward said shaft and engaging one raceway member of the thrust bearing to crowd the other raceway member into driving engagement with the end of the shaft, with coacting means between the block and the first mentioned raceway member to equalize the strain around the thrust bearing in all axial positions of the same, a spring at the rear of said follower and coacting therewith to urge said block and thrust bearing axially toward said shaft end to maintain the aforesaid driving engagement of one of the raceway members with said shaft end, said spring serving to cushion endwise movement of said shaft toward said box.

2. In a device of the character described, a journal box, an anti-friction bearing therein, a shaft radially supported by said bearing, a thrust bearing located at the end of said shaft and within said box, a reciprocating follower guided in a recess in said box and freely movable toward said shaft and engaging one raceway member of the thrust bearing to crowd the other raceway member into driving engagement with the end of the shaft, with coacting means between the block and the first mentioned raceway member to axially center said thrust bearing relatively to the shaft axis, a spring at the rear of said follower and coacting therewith to urge said block and thrust bearing forwardly toward said shaft end to maintain the aforesaid driving engagement of one of the raceway members with said shaft end, said spring serving to cushion endwise movement of said shaft toward said box, and a portion of said follower block overlapping said spring to permit the same to seat against the inner end of the cap before the spring has completed the limit of its compression.

3. In a device of the character described, a journal box, an anti-friction bearing therein, a shaft radially supported by said bearing, a thrust bearing located at the end of said shaft and within said box, a reciprocating follower guided in a recess in said box and freely movable toward said shaft and engaging one raceway member of the thrust bearing to crowd the other raceway member into driving engagement with the end of the shaft, with coacting means between the block and the first mentioned raceway member to axially center said thrust bearing relatively to the shaft axis, a spring at the rear of said follower and coacting therewith to urge said block and thrust bearing forwardly toward said shaft end to maintain the aforesaid driving engagement of one of the raceway members with said shaft end, said spring serving to cushion endwise movement of said shaft toward said box, and means to hold the several parts of said thrust bearing and said follower assembled for unit handling purposes while still permitting said thrust bearing to be self adjustable on said follower for alignment purposes.

4. In a device of the character described, a journal box, an anti-friction bearing therein, a shaft radially supported by said bearing, a thrust bearing located at the end of said shaft and within said box, a reciprocating follower guided in a recess in said box and freely movable toward said shaft and engaging one raceway member of the thrust bearing to crowd the other raceway member into driving engagement with the end of the shaft, with coacting means between the block and the first mentioned raceway member to axially center said thrust bearing relatively to the shaft axis, a spring at the rear of said follower and coacting therewith to urge said block and thrust bearing forwardly toward said shaft end to maintain the aforesaid driving engagement of one of the raceway members with said shaft end, said spring serving to cushion endwise movement of said shaft toward said box, and means to hold said thrust bearing, follower block and cap assembled for unit handling purposes while still allowing the thrust bearing to be self-centering on said follower.

RAYMOND R. SEARLES.